United States Patent
Ahn

(10) Patent No.: US 9,134,563 B2
(45) Date of Patent: Sep. 15, 2015

(54) IN-PLANE SWITCHING MODE LIQUID CRYSTAL DISPLAY DEVICE INCLUDING MULTI-LAYER ELECTRODE

(71) Applicant: LG Display Co., Ltd., Seoul (KR)

(72) Inventor: Ji-Young Ahn, Anyang (KR)

(73) Assignee: LG DISPLAY CO., LTD., Seoul (KR)

(*) Notice: Subject to any disclaimer, the term of this patent is extended or adjusted under 35 U.S.C. 154(b) by 86 days.

(21) Appl. No.: 14/019,271

(22) Filed: Sep. 5, 2013

(65) Prior Publication Data

US 2014/0028940 A1 Jan. 30, 2014

Related U.S. Application Data

(63) Continuation of application No. 11/166,918, filed on Jun. 27, 2005, now Pat. No. 8,542,338.

(30) Foreign Application Priority Data

Oct. 11, 2004 (KR) .......................... 10-2004-081041

(51) Int. Cl.
*G02F 1/1343* (2006.01)
*G02F 1/1335* (2006.01)
*G02F 1/1362* (2006.01)

(52) U.S. Cl.
CPC .... *G02F 1/133512* (2013.01); *G02F 1/134363* (2013.01); *G02F 1/13439* (2013.01); *G02F 2001/13629* (2013.01); *G02F 2001/136218* (2013.01)

(58) Field of Classification Search
CPC .......... G02F 1/134363; G02F 1/13439; G02F 2001/136218
USPC .................................................. 349/141, 147
See application file for complete search history.

(56) References Cited

U.S. PATENT DOCUMENTS

| | | | |
|---|---|---|---|
| 5,745,207 A | 4/1998 | Asada et al. | |
| 5,907,379 A * | 5/1999 | Kim et al. | 349/141 |
| 6,259,502 B1 | 7/2001 | Komatsu | |
| 6,266,117 B1 | 7/2001 | Yanagawa et al. | |
| 6,426,787 B1 | 7/2002 | Satake et al. | |
| 6,506,617 B1 | 1/2003 | Cheng | |
| 6,621,546 B2 | 9/2003 | Yang et al. | |
| 6,628,358 B1 | 9/2003 | Colson | |
| 6,765,642 B2 | 7/2004 | Lee | |
| 6,798,480 B2 | 9/2004 | Ono et al. | |
| 6,801,287 B2 | 10/2004 | Kurahashi et al. | |
| 6,839,108 B1 | 1/2005 | Hirakata et al. | |

(Continued)

FOREIGN PATENT DOCUMENTS

| | | |
|---|---|---|
| JP | 9269508 | 10/1997 |
| JP | 10307296 | 11/1998 |

(Continued)

*Primary Examiner* — Paisley L Arendt
(74) *Attorney, Agent, or Firm* — Dentons US LLP

(57) ABSTRACT

An in-plane switching mode liquid crystal display device includes first and second substrates facing each other, a gate line and a data line arranged on the first substrate crossing each other and defining a pixel region, a switching device at a crossing of the gate line and the data line, a common electrode and a pixel electrode alternately disposed in the pixel region, at least one of the common electrode and the pixel electrode including a multi-layer having a conductor layer and a reflectance reducing layer, and a liquid crystal layer formed between the first and second substrates.

6 Claims, 5 Drawing Sheets

(56) References Cited

U.S. PATENT DOCUMENTS

| | | |
|---|---|---|
| 6,927,808 B2 | 8/2005 | Ono et al. |
| 2003/0234903 A1 | 12/2003 | Hong et al. |
| 2004/0027524 A1 | 2/2004 | Shiota et al. |
| 2004/0057004 A1 | 3/2004 | Kadotani |
| 2004/0114082 A1* | 6/2004 | Lee ................................ 349/141 |

FOREIGN PATENT DOCUMENTS

| | | |
|---|---|---|
| JP | 19990044634 | 6/1999 |
| JP | 2002139737 | 5/2002 |
| KR | 1020010106862 | 12/2001 |
| KR | 1020040013548 | 2/2004 |

\* cited by examiner

IN-PLANE SWITCHING MODE LIQUID CRYSTAL DISPLAY DEVICE INCLUDING MULTI-LAYER ELECTRODE

This application is a continuation of U.S. patent application Ser. No. 11/166,918 filed Jun. 27, 2005 and claims the benefit of Korean Patent Application No. 81041/2004 filed in Korea on Oct. 11, 2004, which is hereby incorporated by reference.

BACKGROUND OF THE INVENTION

1. Field of the Invention

The present invention relates to a liquid crystal display (LCD) device, and more particularly, to an in-plane switching (IPS) mode LCD device and a fabrication method thereof that prevent a blot phenomenon, such as a chuck blot, causing an external light to be reflected.

2. Discussion of the Related Art

In light of the recent developments in various portable information display electronic devices, research is actively ongoing focusing on several types of flat panel display devices including liquid crystal display (LCD) devices, plasma display panel (PDP) devices, field emission display (FED) devices, and vacuum fluorescent display (VFD) devices. In particular, LCD devices have received much attention because they are light and thin, are simple to mass produce, produce high quality images, and have a low power consumption.

An LCD device displays images by controlling a light transmittance of a liquid crystal layer with pixels arranged in a matrix form and applying a data signal according to picture information to each pixel. The LCD device is commonly driven using an active matrix (AM) method in which a switching device, such as a thin film transistor (TFT), is provided in each pixel to apply a voltage to each pixel to change the light transmittance therethrough.

There are various display modes of the LCD devices based on how liquid crystal molecules are driven. For example, a twisted nematic (TN) mode is commonly employed in LCD devices due to advantages, such as easy black and white display function, rapid response time and low driving voltage. The TN mode LCD device drives liquid crystal molecules using an electric field perpendicular to a substrate, such that a director of liquid crystal can have an angle between 0° and 90° with respect to the substrate. However, the TN mode LCD device is disadvantageous in that a viewing angle for an observer is undesirably narrow because the liquid crystal molecules are aligned vertically by the electric field perpendicular to the substrate.

To solve such a narrow viewing angle problem, a new technology, such as an in-plane switching (IPS) mode LCD device, has been proposed. In an IPS mode LCD device, when a voltage is applied to an electrode, an in-plane electric field, which is a horizontal field with respect to a substrate, is formed to align liquid crystal molecules horizontally to obtain wide viewing angle characteristics.

FIG. 1 is a plan view illustrating a portion of a thin film transistor array substrate of an in-plane switching mode liquid crystal display device according to the related art. In FIG. 1, a TFT array substrate includes a gate line 16 and a data line 17 formed thereon crossing each other, thereby defining a pixel region. In the pixel region, a plurality of common electrodes 8 for switching liquid crystal molecules and a plurality of pixel electrodes 18 are alternately disposed parallel to the data line 17 to generate in-plane electric field on the array substrate. The pixel electrodes 18 are electrically connected to each other by a pixel electrode line 18L via first contact holes 40A, and the common electrodes 8 are electrically connected to each other by a common electrode line 8L via second contact holes 40B. The pixel electrode line 18L and the common electrode line 8L are disposed parallel to the gate line 16.

A switching device, such as a thin film transistor (TFT) 20 is provided at the crossing of the gate and data lines 16 and 17. The TFT 20 includes a gate electrode 21, a semiconductor layer (not shown), a source electrode 22 and a drain electrode 23. The gate electrode 21 extends from the gate line 16, the source electrode 22 extends from the data line 17, and the drain electrode 23 extends from the pixel electrode line 18L. In particular, the gate electrode 21 receives a scanning pulse applied from the gate line 16 to turn on the TFT 20. Thus, the TFT 20 selectively transfers a data signal from the data line 16 to the pixel electrodes 18. The common electrodes 8 and the pixel electrodes 18 are formed of a transparent conductor on the same plane to enhance an aperture ratio and luminance of the LCD device. However, it lowers contrast ratio because complete black luminance cannot be obtained in a normal black mode.

In the IPS mode LCD device, various types of patterns, such as lines and electrodes, are formed by repeating a photolithography process. The photolithography process includes coating, exposing, developing, etching and removal a photoresist material. For example, after an object layer is formed on a substrate on which a pattern is desired to be formed, a photoresist material is coated. Then, the substrate is loaded to an exposing device, in which the substrate and a mask are aligned and then light is irradiated the substrate through the mask. Subsequently, the exposed photoresist film region is developed to form a certain photoresist pattern. Then, the object layer is etched into a desired pattern by using the photoresist film pattern.

If the object layer positioned on the substrate is made of a transparent film, when the substrate loaded on a chuck is exposed, light beam irradiated on the substrate transmits through both the transparent film, namely, the object layer, and the substrate, as well as the photoresist film. Then, light is reflected by the chuck made of metal to re-transmit through the photoresist film. As a result, the photoresist film positioned at the upper portion of the chuck is exposed twice by the reflected light, thereby increasing the light exposure amount. Thus, there is a difference of the light exposure amount between a region of the substrate which contacts with the chuck and a region of the substrate which does not contact with the chuck. Because of the difference in light exposure, the shape of the photoresist pattern, such as its width, differs according to each region, resulting in generation of a critical dimension (CD) deficiency with a transparent electrode formed through the photoresist pattern, which results a blot on a screen.

As a result, when the pixel electrode and the common electrode of the IPS mode LCD device are made of the transparent conductor, the width of the electrode which determines an aperture ratio of the LCD device changes according to each region on the substrate due to the exposed amount by the reflected light. Hence, a chuck blot is generated on a display screen of the LCD device.

SUMMARY OF THE INVENTION

Accordingly, the present invention is directed to an in-plane switching mode liquid crystal display device that substantially obviates one or more of the problems due to limitations and disadvantages of the related art.

An object of the present invention is to provide an in-plane switching (IPS) mode liquid crystal display (LCD) device capable of preventing generation of a blot that may be generated as an external light is reflected in fabricating a panel.

Another object of the present invention is to provide an in-plane switching (IPS) mode liquid crystal display (LCD) device capable of enhancing a contrast ratio of a screen.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device includes first and second substrates facing each other, a gate line and a data line arranged on the first substrate crossing each other and defining a pixel region, a switching device at a crossing of the gate line and the data line, a common electrode and a pixel electrode alternately disposed in the pixel region, at least one of the common electrode and the pixel electrode including a multi-layer having a conductor layer and a reflectance reducing layer, and a liquid crystal layer formed between the first and second substrates.

In another aspect, a method of fabricating an in-plane switching (IPS) mode liquid crystal display device includes forming a gate electrode and a gate line on a first substrate, forming a gate insulation film on the first substrate including the gate electrode and the gate line, forming a semiconductor layer on the first substrate including the gate insulation film, forming a data line, a source electrode and a drain electrode on the first substrate including the semiconductor layer, forming a passivation film on the first substrate including the data line, forming a common electrode and a pixel electrode disposed alternately on the passivation film, at least one of the common electrode and the pixel electrode including a multi-layer having a conductor layer and a reflectance reducing layer, and attaching the first substrate to a second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
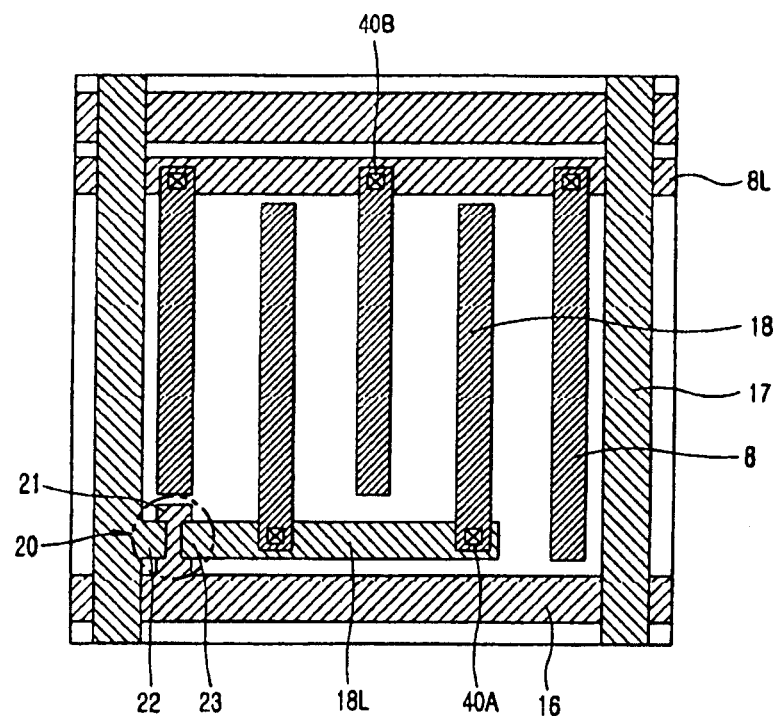
FIG. 1 is a plan view illustrating a portion of a thin film transistor array substrate of an in-plane switching mode liquid crystal display device according to the related art.
Figure 2:
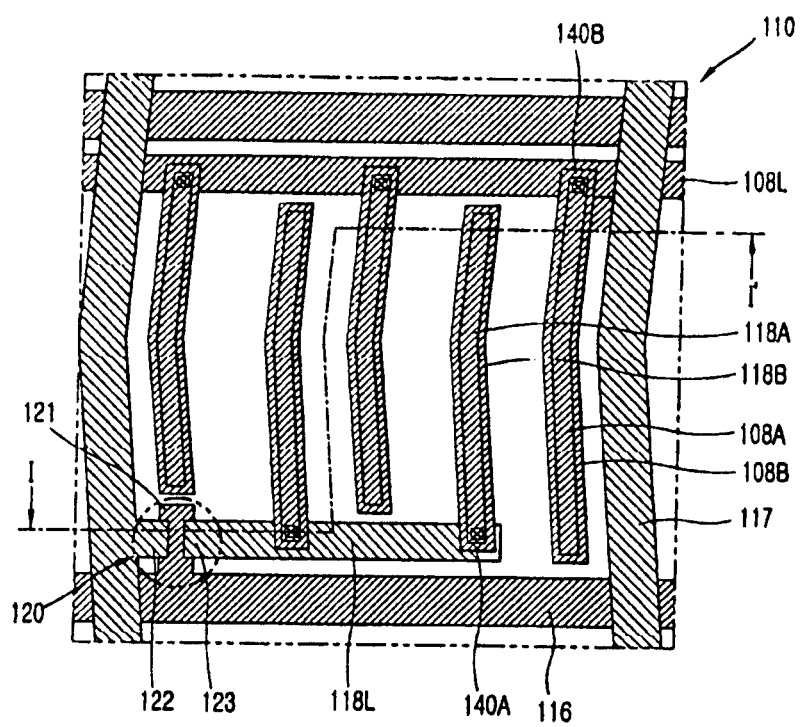
FIG. 2 is a plan view illustrating a portion of a TFT array substrate of an exemplary IPS mode LCD device in accordance with an embodiment of the present invention.
Figure 3:
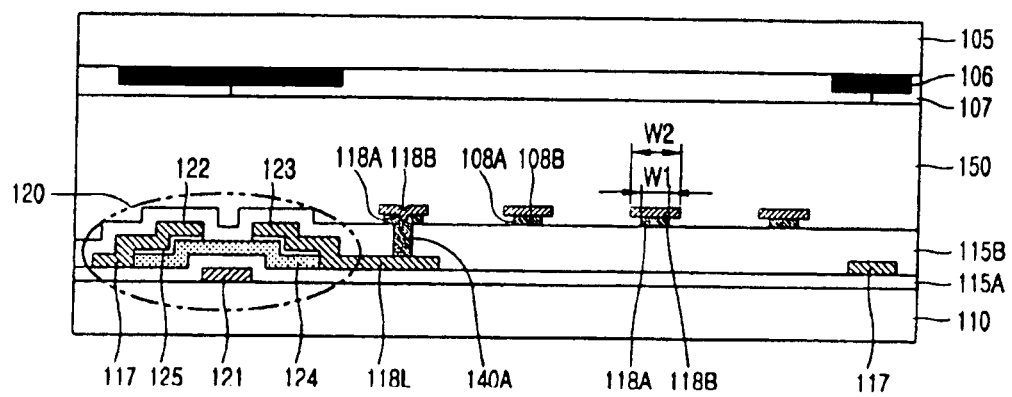
FIG. 3 is a cross-sectional view along line I-I' of the array substrate shown in FIG. 2 and a corresponding color filter substrate of the LCD device.

FIG. 2 is a plan view illustrating a portion of a TFT array substrate of an exemplary IPS mode LCD device in accordance with an embodiment of the present invention, and FIG. 3 is a cross-sectional view along line I-I' of the array substrate shown in FIG. 2 and a corresponding color filter substrate of the LCD device. As show in FIGS. 2 and 3, an IPS mode LCD device includes a first substrate 110. A gate line 116 and a data line 117 are arranged crossing each other to thereby define a pixel region on the first substrate 110. A thin film transistor 120 is provided at the crossing of the gate line 116 and the data line 117 in each pixel region. The TFT 120 includes a gate electrode 121, a gate insulation film 115A on the gate electrode 121, a semiconductor layer 124 on the gate insulation film 115A, an ohmic contact layer 125 and source and drain electrodes 122 and 123 spaced apart from each other on the semiconductor layer 124. The gate electrode 121 may be a portion protruding from the gate line 116, and the source electrode 122 may be a portion protruding from the data line 117. A passivation film 115B is formed on the entire surface of the first substrate 110 including the TFT 120. The passivation film 115B may include an organic insulation film with a low dielectric constant, such as an acrylic resin, benzocyclobutene (BCB) and a polyimide resin.

In the pixel region, a plurality of common electrodes 108A and 108B and a plurality of pixel electrodes 118A and 118B are alternately disposed on the passivation film 115B to generate in-plane electric field therebetween. The common electrodes 108A and 108B may be paired in a one-to-one relationship overlapping one another. Similarly, the pixel electrodes 118A and 118B may be paired in a one-to-one relationship overlapping one another. In addition, the common electrodes 108A and 108B and the pixel electrodes 118A and 118B may have a bent shape and may have a shape corresponding to the shape of the data line 117. The pixel electrodes 118A and 118B within the same pixel region are electrically connected to each other by a pixel electrode line 118L via first contact holes 140A, and the common electrodes 108A and 108B are electrically connected to each other by a common electrode line 108L via second contact holes 140B. The pixel electrode line 118L and the common electrode line 108L may be parallel to the gate line 116.

The common electrodes 108A and 108B and the pixel electrodes 118A and 118B are formed as a dual layer of reflectance reducing layers 108A and 118A and conductor layers 108B and 118B, respectively. The reflectance reducing layers 108A and 118A may be opaque layers with a surface reflectance of below 10% that respectively contact with the conductor layers 108B and 118B. Thus, light irradiated toward the conductor layers 108B can be prevented from being reflected after transmitting through the conductor layers 108B and 118B. For example, the reflectance reducing layers 108A and 118A may include an opaque metal oxide or metal nitride, such as chrome-oxide (CrOx), chrome-nitride (CrNx), molybdenum-oxide (MoOx) and molybdenum-nitride (MoNx), or an organic coating film, such as a black resin. The conductor layers 108B and 118B may include a transparent conductor, such as an indium-tin-oxide (ITO), indium-zinc-oxide (IZO), indium-tin-zinc-oxide (ITZO), tin-oxide (TO), or the like, to enhance luminance of the LCD device. Although not shown, the common electrodes 108A and 108B and the pixel electrodes 118A and 118B may be formed as multi-layer electrodes having more than two layers.

Since the reflectance reducing layers 108A and 118A are formed on the region where the reflectance reducing layers 108A and 118A can contact with the central portion of the lower surface of the conductor layers 108B and 118B, a deficiency caused by the external light reflection, such as the chuck blot generated during the process of fabricating of the electrodes, can be prevented. Further, when the common electrode and the pixel electrode are formed of a transparent conductor material, screen contrast ratio can also be improved.

In the exposing process, if the etching-subject layer formed on the substrate is the transparent film, e.g., the ITO layer for forming the common electrode and the pixel electrode, light beam coming during exposing transmits through the etching-subject layer and the substrate, reflected by an exposing chuck supporting the substrate, and then, re-irradiated on a photoresist film disposed at an upper portion of the etching-subject layer. Then, the photoresist film is exposed twice by the reflected light, so the photoresist film pattern for forming electrodes changes, which resultantly makes the width of the common electrode and the pixel electrode, which determine an aperture ratio of the LCD device, different according to each region, and thus, a blot appears on the screen.

In the IPS mode LCD device, the width of the pixel electrode and the common electrode is a critical factor for determining an aperture ratio. Thus, if there is a difference in an exposing degree with respect to the photoresist film by the reflected light during the exposing process for formation of the common electrode and the pixel electrode, the width of electrodes differs according to each region depending on a strength distribution of the reflected light. The resultant difference in widths then changes the aperture ratio, thereby generating a blot on a display screen. Thus, in an embodiment of the present invention, when the common electrode and the pixel electrode are formed, the opaque film for forming the reflectance reducing layer is disposed at an upper portion or at a lower portion of the transparent film, thereby preventing external light reflection during the exposing process and avoiding the generation of a blot on a display screen.

In addition, as shown in FIG. 3, the IPS mode LCD device includes a second substrate 105 facing the first substrate 110. The second substrate 105 includes a black matrix 106 and a color filter 107 formed thereon. The black matrix 106 may include an opaque material corresponding an area of the TFT 120, the data line 117 and the gate line 116. The color filter 107 may include red, green and blue sub-color filters with each of the sub-color filters corresponding to a pixel region. Although not shown, the color filter 107 may instead be formed on the first substrate 110.

The reflectance reducing layers 108A and 118A and the conductor layers 108B and 118B may respectively have the same width. Alternatively, the reflectance reducing layers 108A and 118A preferably have a narrower width than a width of the conductor layers 108B and 118B. For example, a first width W1 of the reflectance reducing layers 108A and 118A is narrower than a second width W2 of the conductor layers 108B and 118B. Thus, the reflectance reducing layers 108A and 118A contact with the central portion but not the edge portion of the conductor layers 108B and 118B. As a result, the LCD device of the present invention can implement an excellent screen contrast ratio as well as obtain the same aperture ratio and luminance as those when the common electrodes 108A and 108B and the pixel electrodes 118A and 118B are formed as transparent conductors.

Figure 4A:
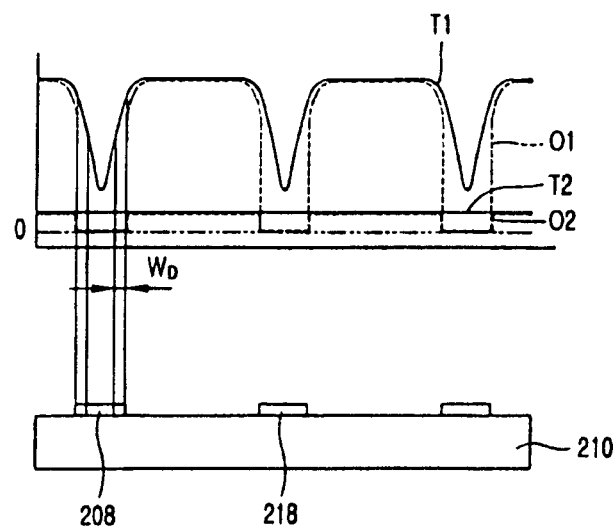
FIGS. 4A and 4B are graphs illustrating light transmittance characteristics according to an electrode structure.
Figure 4B:
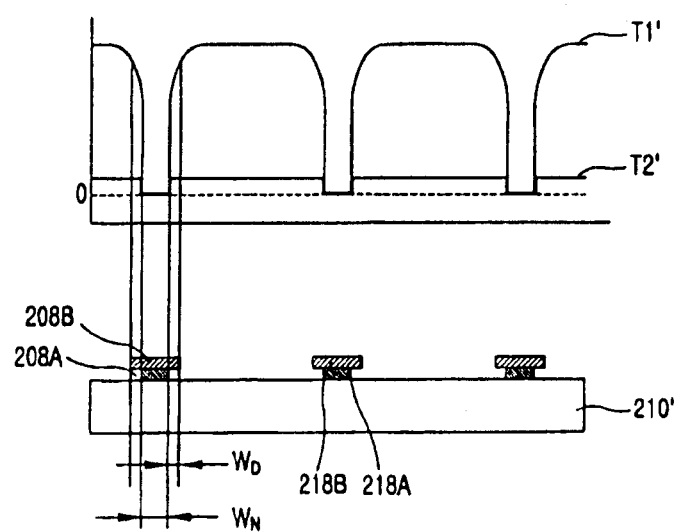

FIGS. 4A and 4B are graphs illustrating light transmittance characteristics according to an electrode structure. In FIG. 4A, solid lines T1 and T2 respectively indicate light transmittance in the normal white mode and in the normal black mode when the electrodes 208 and 218 are made of a transparent conductor in the IPS mode LCD device. Dotted lines 01 and 02 respectively indicate light transmittance in the normal white mode and in the normal black mode when the electrodes 208 and 218 are made of the opaque conductor, e.g., metal, in the IPS mode LCD device. When the electrodes 208 and 218 are made of the opaque conductor, light cannot be transmitted at the upper region of the electrode 206 in both normal black mode and normal white mode, resulting in that light transmittance 01 and 02 at the upper portion of the electrodes 208 and 218 is 0. In comparison, when the electrodes 208 and 218 are made of the transparent conductor, light is partially leaked at the upper portion of the electrode 208 and 218 in the normal black mode, failing to implement complete black luminance over the entire region of the substrate 210 including the electrodes 208 and 218. Accordingly, when the electrodes 208 and 218 are made of the transparent conductor, light transmittance T2 at the upper portion of the electrode 208 increases by a certain numerical value.

In addition, in the normal white mode, liquid crystal molecules are driven at a certain region of the upper portion of the electrodes 208 and 218, such that a small amount of light is transmitted to have a light transmittance T1 having a parabolic shape as shown in FIG. 4A. Thus, black luminance and white luminance of the LCD device increase. A region for bettering the aperture ratio substantially in the normal white mode, among the entire area of the upper portion of the electrode 208, is limited to the edge portion $W_D$ of the electrodes 208 and 218. In other words, the central portion of the electrodes 208 and 218 except for the edge portion $W_D$ does not affect increase of the white luminance and the aperture ratio. This is because, in terms of the characteristics of the IPS mode LCD device, an in-plane electric field for driving liquid crystal is not substantially generated from the upper portion, especially at the central portion of the electrode. Thus, the central portion of the electrode works as a light blocking region.

FIG. 4B shows light transmittance characteristics of each region on the substrate 210' when the opaque reflectance reducing layers 208A and 218A are disposed at a lower portion of the transparent conductor layer in the IPS mode LCD device in accordance to an embodiment of the present invention. As shown in FIG. 4B, light transmittance T1' of the LCD device has a high value at the edge portion $w_D$, corresponding to the region except for the central portion $w_N$ of the conductor layers 208B and 218B. The transmittance T1' and T2' of the central portion $w_N$ of the conductor layers 208B and 218B, which is the corresponding region of the reflectance reducing layers 208A and 218A, are 0 in the normal black mode and in the normal white mode, implementing complete black luminance. Accordingly, a contrast ratio is improved. As a result, by including the reflectance reducing layer at the common electrode and pixel electrode, the deficiency of chuck blot can be prevented compared with the case where both the common electrode and the pixel electrode are formed as transparent conductor layers. In addition, the same high luminance as in the case where both the common electrode and the pixel electrode are formed as transparent conductor layers can be obtained.

By adding the reflectance reducing layer to the common electrode and the pixel electrode, the chuck blot, which is generated in the structure of forming the common electrode and the pixel electrode only as the transparent conductors, can be prevented. Since generation of reflected light on the surface of the chuck made of the metal material for fixing the substrates during the exposing process is prevented, the photoresist film cannot be exposed twice. Thus, the amount of exposing which is relatively high at the region where the chuck is positioned can be resolved. In other words, the photoresist film is not exposed twice, appearance of the chuck blot at the transparent common electrode and pixel electrode positioned at the upper portion of the chuck can be prevented. Accordingly, the variation rate of the aperture ratio of the LCD device due to the non-uniformity of the photoresist pattern according to a region can be reduced, and the chuck blot can be prevented.

Although not shown, in an embodiment of the present invention, a conductive metal layer can be additionally formed at the common electrode and the pixel electrode to form a multi-electrode structure. By doing that, resistance of the conductor layer can be reduced. In addition, because the electrode can be formed to be thin, deficiency of picture quality due to light leakage according to a step can be prevented.

Figure 5A:
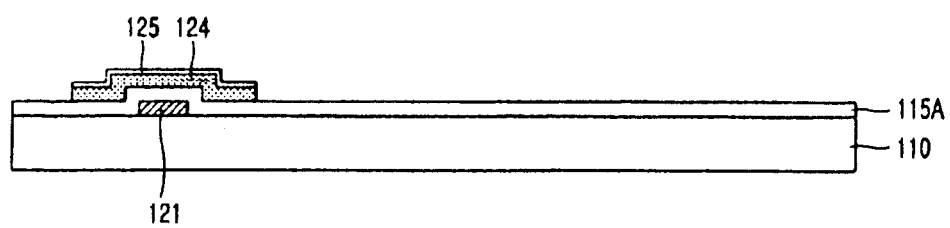
FIGS. 5A to 5E are cross-sectional views along line I-I' of the TFT array substrate shown in FIG. 2 illustrating a fabrication method thereof according to an embodiment of the present invention.

FIGS. 5A to 5E are cross-sectional views along line I-I' of the TFT array substrate shown in FIG. 2 illustrating a fabrication method thereof according to an embodiment of the present invention. As shown in FIG. 5A, a gate line (not shown) and a gate electrode 121 extending from the gate line are formed on a first substrate 110. The first substrate 110 may be formed of a transparent insulation material, such as glass or quartz. In addition, a gate insulation film 115A is formed on the first substrate 110 covering the gate line and the gate electrode 121. Then, an amorphous silicon thin film and an n+ amorphous silicon thin film are sequentially formed on the substrate 110. The amorphous silicon thin film and the n+ amorphous silicon thin film are then patterned to respectively form a semiconductor layer 124 and an ohmic contact layer 125 overlapping the gate electrode 121.

Figure 5B:
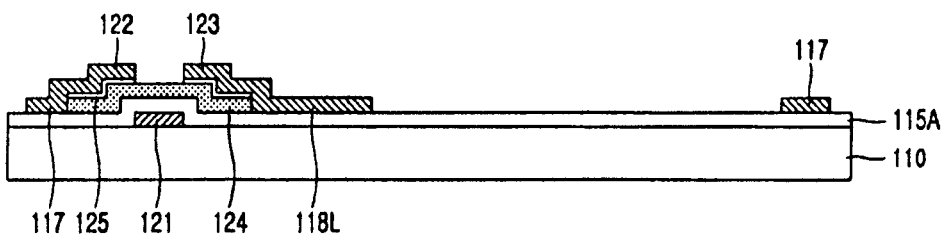

As shown in FIG. 5B, a conductive metal layer is formed on the first substrate 110 and patterned to form a data line 117 and source/drain electrodes 122 and 123. In addition, a portion of the ohmic contact layer 125 corresponding to a channel portion of the semiconductor layer 124 is removed. For example, the source/drain electrodes 122 and 123 may be used as an etch mask to remove a portion of the ohmic contact layer 125, thereby exposing a portion of the semiconductor layer 124. Further, a portion of the source electrode 122 may be connected to the data line 117, and a portion of the drain electrode 123 may extend toward a pixel region to form a pixel electrode line 118L.

Figure 5C:
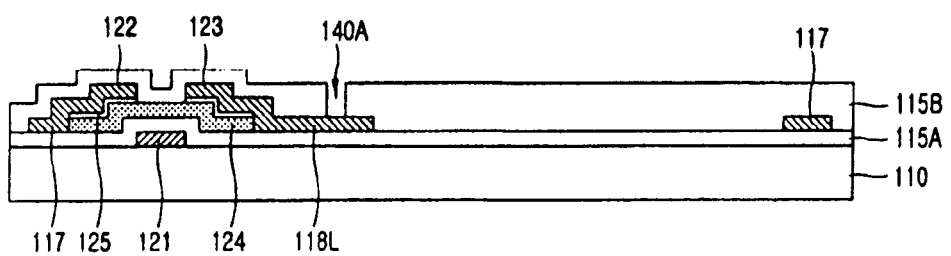

As shown in FIG. 5C, a passivation film 115B is deposited on the first substrate 110 and patterned to form a first contact hole 140A exposing a portion of the pixel electrode line 118L.

Figure 5D:
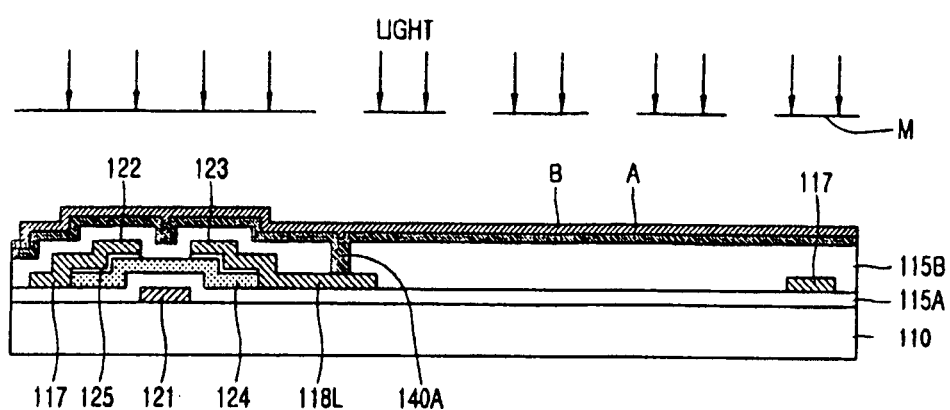

As shown in FIG. 5D, an opaque film A and a conductive transparent film B are formed on the first substrate 110. The transparent film B may include a transparent conductor, such as an indium-tin-oxide (ITO), indium-zinc-oxide (IZO), indium-tin-zinc-oxide (ITZO), tin-oxide (TO), or the like. The opaque film A may include metal oxide or metal nitride, such as chrome-oxide (CrOx), chrome-nitride (CrNx), molybdenum-oxide (MoOx) and molybdenum-nitride (MoNx), or an organic film, such as a black resin. The opaque film A and the transparent film B are patterned. For example, the opaque film A and the transparent film B may be etched through the photolithography process using an etch mask M.

Figure 5E:
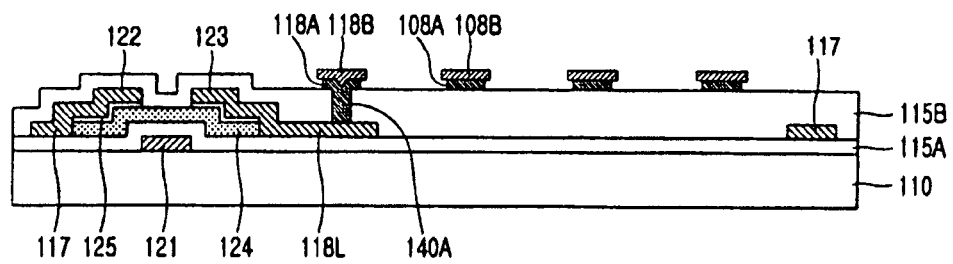

As shown in FIG. 5E, the opaque film A and the transparent film B (shown in FIG. 5D) are patterned to form first and second reflectance reducing layers 108A and 118A and first and second transparent conductor layer 108B and 118B. In particular, the second reflectance reducing layer 118A is formed in the first contact hole 140A to electrically connect to the pixel electrode line 118L. The first reflectance reducing layer 108A and the first transparent conductor layer 108B may be paired in a one-to-one relationship overlapping one another to form one common electrode. Similarly, the second reflectance reducing layer 118A and the second transparent conductor layer 118B may be in a one-to-one relationship overlapping one another to form one pixel electrode. Although not shown, each of the common electrode and the pixel electrode may a multi-layered structure having more than the first reflectance reducing layer 108A and the first transparent conductor layer 108B or the second reflectance reducing layer 118A and the second transparent conductor layer 118B.

The transparent conductor layers 108B and 118B positioned at the upper portion may be etched to have a first width. Then, the reflectance reducing layers 108A and 118A are over-etched to have a second width by using the patterned transparent conductor layers 108B and 118B as masks. Then, since the first width of the opaque reflectance reducing layers 108A and 118A is smaller than the width of the transparent conductor layers 108B and 118B. Accordingly, the screen contrast ratio and luminance can be enhanced. Although not shown, the first and second transparent conductor layers 108B and 118B may have different widths from one another, and the first and second reflectance reducing layers 108A and 118A may have different widths from one another, as long as the opaque reflectance reducing layers 108A and 118A have a width W1 that does not decrease white luminance of the transparent conductor layers 108B and 118B.

Accordingly, in an embodiment of the present invention, the common electrode and the pixel electrode are formed as dual- or multi-layer electrodes including the transparent conductor layer and the opaque reflectance reducing layer. Alternatively, only one of the common electrode and pixel electrode have the dual-layer or multi-layer electrodes. The common electrode and the pixel electrode formed as the dual- or multi-layer may be formed and patterned in the same process. When they are simultaneously formed on the same layer, intervals among electrodes are uniform, thereby improving picture quality.

The reflectance reducing layer can be formed of a photoresist black resin, which can serve as a light blocking layer for preventing light leakage from an upper portion of the electrodes. The black resin can be formed at an upper portion of a conductor. Since the black resin itself serves as a photoresist, the photolithography process can be performed without a process of coating the photoresist. Thus, the process of forming the common electrode and the pixel electrode may include forming a conductive transparent film on a passivation film; forming an opaque film as the black resin on the transparent film; etching the opaque film through the photolithography process to form a reflectance reducing layer with a second width; and etching the transparent film by using the etched reflectance reducing layer as a mask to form a conductor layer with a first width.

A gate pad part and a source pad part also may be formed as a multi-layer like the common electrode and the pixel electrode, only as a transparent conductor through a process of using a metal mask, only as a transparent conductor layer and a reflectance reducing layer, or only as a reflectance reducing layer. Thus, resistance of the pad part can be lowered or reliability of the pad part can be enhanced by using various designing methods.

Although not shown, the common electrode and the pixel electrode may be formed as the multi-layer electrodes having a shape of a short straight line or in a zig-zag form. In the case where the common electrode and the pixel electrode are bent or in the zig-zag form in the pixel region, liquid crystal molecules positioned in the pixel region are not all arranged in one direction. Instead, the liquid crystal molecules are arranged indifferent directions to induce a multi-domain, thereby offsetting abnormal light due to a birefringence characteristics of the liquid crystal molecules and minimizing a color shift phenomenon. The common electrode and the pixel electrode may have a bent angle of the zig-zag structure within a range of about 1°~30° with respect to an alignment direction of the liquid crystal molecules.

The present invention features that the reflectance reducing layer is formed at the upper portion or at the lower portion of the electrodes formed in the pixel and the blot deficiency caused by reflection of external light is enhanced. In this respect, the present invention is not limited to the electrodes made of the transparent conductor, such as ITO. For example, by additionally forming the opaque metal layer besides the transparent conductor layer, a triple-layer electrode can be formed, and in this case, degradation of picture quality can be solved compared with the case where the electrode is formed only as the transparent conductor, and abnormal light transmitted when liquid crystal molecules are abnormally arranged at the upper portion of the transparent electrode can be prevented by the conductive metal layer.

In addition, in the case where the common electrode and the pixel electrode are formed only as the opaque conductor layers made of an opaque metal on the passivation film, if the reflectance reducing layer made of the metal oxide or metal nitride is formed at the upper or lower portion, the external light reflection phenomenon by light transmitted from an external light source of the display can be reduced and thus the screen blot phenomenon can be prevented.

In an embodiment of the present invention, the pixel electrodes and the common electrodes have a dual-layered structure having an opaque metal layer and a reflectance reducing layer. The opaque metal layer may include one of molybdenum (Mo), aluminum (Al), aluminum-neodiminum (Al—Nd), copper (Cu), chrome (Cr), titanium (Ti) and their alloy. In another embodiment of the present invention, the pixel electrodes and the common electrodes have a triple-layered structure having a transparent conductor layer, a reflectance reducing layer and an opaque metal layer, and these three layers may be formed in any order.

It will be apparent to those skilled in the art that various modifications and variations can be made in the in-plane switching mode liquid crystal display device of the present invention without departing from the spirit or scope of the invention. Thus, it is intended that the present invention covers the modifications and variations of this invention provided they come within the scope of the appended claims and their equivalents.

What is claimed is:

1. An in-plane switching mode liquid crystal display device, comprising:
   first and second substrates facing each other;
   a gate line and a data line arranged on the first substrate crossing each other and defining a pixel region;
   a switching device at a crossing of the gate line and the data line on the first substrate;
   a passivation film on the first substrate, wherein the passivation film includes a contact hole;
   a common electrode and a pixel electrode directly on the passivation film and generating an electric field substantially parallel to a surface of the first and second substrates in the pixel region, at least one of the common electrode and the pixel electrode has a triple-layered structure including an opaque metal layer, a transparent conductor layer over the opaque metal layer, and a reflectance reducing layer between the opaque metal layer and the transparent conductor layer; and
   a liquid crystal layer formed between the first and second substrates.

2. The device of claim 1, wherein the opaque metal layer includes one of molybdenum (Mo), aluminum (Al), aluminum-neodiminum (Al—Nd), copper (Cu), chrome (Cr), titanium (Ti) and an alloy thereof.

3. The device of claim 1, wherein the reflectance reducing layer has a surface light reflectance of about 10% or less.

4. The device of claim 1, wherein the reflectance reducing layer includes one of a metal oxide, a metal nitride or a black resin.

5. The device of claim 1, wherein the transparent conductor layer includes one of indium-tin-oxide (ITO), indium-zinc-oxide (IZO), indium-tin-zinc-oxide (ITZO) and tin-oxide (TO).

6. An in-plane switching mode liquid crystal display device, comprising:
   first and second substrates facing each other;
   a gate line and a data line arranged on the first substrate crossing each other and defining a pixel region;
   a switching device at a crossing of the gate line and the data line on the first substrate;
   a passivation film on the first substrate, wherein the passivation film includes a contact hole;
   at least one pair of metal layers on the passivation film in the pixel region to generate an electric field therebetween, wherein the at least one pair of metal layers have a triple-layered structure including:
   transparent conductive layers directly on the passivation film;
   opaque metal layers on the transparent conductive layers; and
   metal compound layers between the opaque metal layers and the transparent conductive layers; and
   a liquid crystal layer formed between the first and second substrates.

* * * * *